(12) United States Patent
Carballo

(10) Patent No.: US 7,869,838 B2
(45) Date of Patent: *Jan. 11, 2011

(54) GLOBAL MANAGEMENT OF LOCAL LINK POWER CONSUMPTION

(75) Inventor: Juan-Antonio Carballo, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/331,179

(22) Filed: Dec. 9, 2008

(65) Prior Publication Data

US 2009/0088097 A1    Apr. 2, 2009

Related U.S. Application Data

(63) Continuation of application No. 10/743,653, filed on Dec. 22, 2003, now Pat. No. 7,466,996.

(51) Int. Cl.
*H04B 1/38* (2006.01)
*G06F 1/26* (2006.01)
*H04L 12/28* (2006.01)

(52) U.S. Cl. .............. 455/574; 455/343.1; 455/522; 713/320; 370/351

(58) Field of Classification Search .......... 455/574, 455/343.1, 423, 424; 713/320; 370/351
See application file for complete search history.

(56) References Cited

U.S. PATENT DOCUMENTS

| | | | | |
|---|---|---|---|---|
| 6,366,143 B1 * | 4/2002 | Liu et al. | ............ | 327/142 |
| 6,560,243 B1 * | 5/2003 | Mogul | ............ | 370/468 |
| 6,732,190 B1 * | 5/2004 | Williams et al. | ............ | 709/250 |
| 6,735,448 B1 * | 5/2004 | Krishnamurthy et al. | ............ | 455/522 |
| 6,795,450 B1 * | 9/2004 | Mills et al. | ............ | 370/463 |
| 6,856,597 B1 * | 2/2005 | Scott | ............ | 370/234 |

(Continued)

FOREIGN PATENT DOCUMENTS

WO    0228019 A2    4/2002

OTHER PUBLICATIONS

Kun Jung Chang, et al., 50 GB/S 32X32 CMOS Crossbar Chip Using, VLSI Circuits Issue Digest of Technical Papers, 1999, pp. 17-19.

(Continued)

*Primary Examiner*—Duc M Nguyen
(74) *Attorney, Agent, or Firm*—Libby Z. Toub; Schubert Law Group PLLC

(57) ABSTRACT

Power reduction in links, such as transmitters and receivers, based upon global decisions such as the data transmission frequencies, communications media, and traffic types associated with links, is disclosed. In particular, embodiments take advantage of high-level decisions by reconfiguring internal circuits of transmitters and receivers of links to reduce power consumption. At the global level, a decision determines the links that are active, the data frequency at which the links operate, and the media through which the links transmit the data. At the local level, the links receive the decisions and reconfigure circuitry automatically to minimize power based upon the decisions. In some embodiments, the links may receive the decisions in the form of power modes. In further embodiments, the links may receive settings such as on/off settings, data frequency settings, and traffic/media settings, the combination of which indicates power modes.

17 Claims, 3 Drawing Sheets

U.S. PATENT DOCUMENTS

| | | | | |
|---|---|---|---|---|
| 6,859,882 | B2* | 2/2005 | Fung | 713/300 |
| 6,894,602 | B2* | 5/2005 | Browning | 340/286.02 |
| 6,986,069 | B2* | 1/2006 | Oehler et al. | 713/320 |
| 7,002,949 | B2* | 2/2006 | Garcia-Luna-Aceves et al. | 370/351 |
| 7,047,428 | B2* | 5/2006 | Bui | 713/320 |
| 7,127,521 | B2* | 10/2006 | Hsu et al. | 709/233 |
| 7,131,015 | B2* | 10/2006 | Flautner et al. | 713/320 |
| 7,143,300 | B2* | 11/2006 | Potter et al. | 713/323 |
| 7,237,129 | B2* | 6/2007 | Fung | 713/323 |
| 7,292,597 | B2* | 11/2007 | Mills et al. | 370/433 |
| 7,327,754 | B2* | 2/2008 | Mills et al. | 370/463 |
| 7,466,996 | B2* | 12/2008 | Carballo | 455/574 |
| 2003/0196126 | A1* | 10/2003 | Fung | 713/300 |
| 2004/0153507 | A1* | 8/2004 | Zeitler et al. | 709/205 |
| 2004/0253924 | A1* | 12/2004 | Acampora | 455/41.2 |
| 2005/0138441 | A1* | 6/2005 | Huffman et al. | 713/300 |
| 2005/0177755 | A1* | 8/2005 | Fung | 713/300 |
| 2005/0281355 | A1* | 12/2005 | Cranford et al. | 375/316 |

OTHER PUBLICATIONS

M. J. Lee, et al., 84 -m W 4-Gb/s Clock and Data Recovery Circuit for Serial Link Applications, Symposium on VLSI Circuits Issue Digest of Technical Papers, 2001, pp. 149-152.

J.M. Khoury, et al., High Speed Serial Transceivers for Data, IEEE Communications Magazine, Issue Jul. 2001, vol. 39, Issue 7, pp. 160-165.

R. Farjad-Rad, et al., C. 3-M CMOS 8 Gigabit/s 4-PAM Serial Link, IEEE Journal of Solid State Circuits, Issue May 2000, pp. 757-764.

W. Dally, et al., Transmitter Equal for 4 Gbits/Second Sig., Proc Hot Interconnects Symposium, Issue Aug. 1996, pp. 29-39.

C.K. Ken Yang, et al., 0.5 M CMOS 4GB/S Serial Link Transceiver, IEEE Journal of Solid State Circuits, Issue May 1998, pp. 713-722.

* cited by examiner

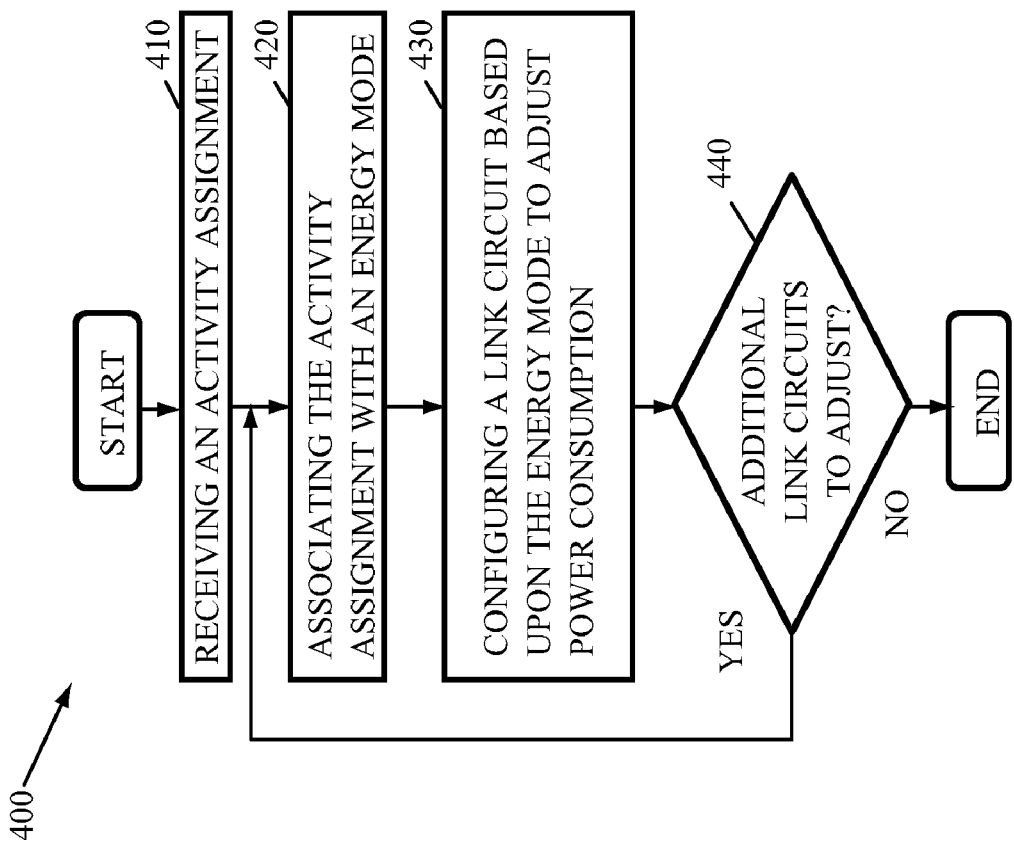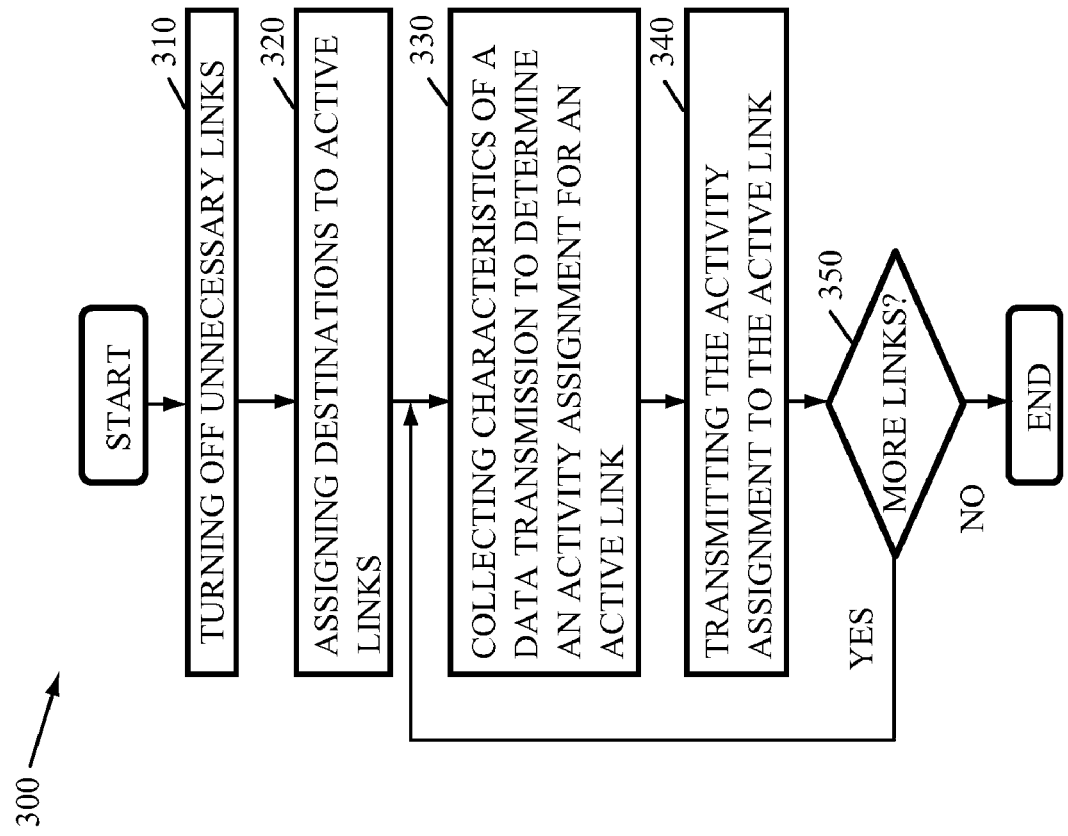

GLOBAL MANAGEMENT OF LOCAL LINK POWER CONSUMPTION

CROSS-REFERENCES TO RELATED APPLICATIONS

This application is a continuation application of U.S. patent application Ser. No. 10/743,653, entitled "Global Management of Local Link Power Consumption", filed Jan. 22, 2003, the disclosure of which is incorporated herein in its entirety for all purposes.

BACKGROUND

The present invention is in the field of communications channels, or links. More particularly, the present invention relates to methods and arrangements for power reduction in links, such as transmitters and receivers, based upon global decisions such as the data transmission frequency, communications media, and traffic type associated with the links.

Communication systems typically include logic and hardware to transmit data from an origin to a destination. In particular, communication systems have routing or switching logic to make high-level decisions that select ports, routes, and media for transmitting the data. Communication systems also include links, each having a transmitter, a medium, and a receiver, to transmit the data in response to those high-level decisions.

The origin clocks the data originally. Then, each intermediate link, or more specifically, the link's transmitter typically clocks the data and transmits to the link's receiver or the destination.

Devices such as routers typically access a network identification (NETID) for the data transmission to determine the destination and calculate the route to the destination through intermediate links based upon a routing protocol and a routing table that includes information about the communication system's topology. The routing protocol dynamically determines routing for the data transmission, taking into consideration changing conditions of the communication network such as unavailable links. Routing tables, for instance, may associate links with ports, or port numbers, through which the data transmission should be routed.

Upon determining the port for the data transmission, the transmission is routed through that port to the destination or another, intermediate destination. Some of the more complex routers, such as routers for super computers, may also select a medium through which the transmitter and receiver will transmit the data.

The transmitters and receivers may consume more power depending upon the data transmission and the media through which the data transmission is routed. In particular, data transmissions at higher data frequencies, with difficult data traffic types or patterns, via long media, and/or via lossy media, require amplifiers and complex, mixed-signal circuitry. The amplifiers and complex, mixed-signal circuitry improve or maximize the sampling window for bits of data in the data transmission to maintain an acceptable bit error rate (BER), i.e., the number of misinterpreted bit values for the data transmission.

Higher data frequencies require internal circuits of transmitters and receivers to operate at high clock frequencies and, thus, high voltage levels, to sample and re-transmit the data in each intermediate link. Further, when the clock frequencies of a transmitter and receiver pair have differences in phase that change over time, often referred to as spread spectrum signaling, the receiver may include a clock and data recovery (CDR) loop with second and, possibly, third order frequency tracking circuits running at high internal frequencies.

Similarly, demanding traffic types, which include patterns that do not often switch between logical ones and zeros or that switch between ones and zeros in irregular or sporadic patterns, require complex internal circuits of transmitters and receivers that may operate at high clock frequencies to capture the relatively few transitions. The phase of the sampling clock is adjusted based upon the phase of the data signal as determined from those relatively few transitions.

With regards to long and/or lossy media, the amplitude of the data transmission may attenuate in a frequency-dependent manner. Amplification and pre-emphasis by the transmitter as well as amplification and equalization by the receiver accentuate certain frequencies to increase the sampling window. Other circuitry such as internal loop filters may be more complex when the media is long and/or lossy.

The amplification and complex, mixed-signal circuitry, however, significantly increase the overall power consumption for the communication system. For example, serial links within a large interconnect system such as a super computer may consume 20 to 37% of total power consumption.

Further, the amplifiers and complex, mixed-signal circuitry continue to operate at full power even when such circuitry is unnecessary. For example, a high-level decision may make a link inactive or switch the media for the link from a long medium that requires the complex, mixed-signal circuitry, to a shorter medium that does not require such circuitry.

Thus, there is a need for methods and arrangements for power reduction in link circuits such as transmitters and receivers based upon global, or high-level, decisions such as the activity, data transmission frequency, communications media, and traffic type associated with links.

SUMMARY

One embodiment provides an apparatus to retransmit a data transmission between a first device and a second device via intermediate links. The apparatus comprises a global link control to determine ports of the intermediate links to transmit the data transmission to a destination device; to determine an activity assignment for the ports of the multiple links based upon forwarding logic, wherein determining the activity assignment comprises determining a data frequency, traffic type, and medium type for the data transmission; and to transmit a control signal with the activity assignment to local link controls of the intermediate links associated with the data transmission. The apparatus also comprises a first port and a second port. The first port may communicatively couple with a transmitter of the first device via a first data transmission medium to form a first intermediate link of the intermediate links. The first port may comprise a first link circuit to couple to the first data transmission medium, to receive the data transmission from the first device, and a first local link control of the local link controls responsive to the control signal from the global link control to configure the first link circuit to operate in a first power mode of multiple power modes associated with the first link circuit based upon the activity assignment. The second port may communicatively couple with a receiver of the second device via a second data transmission medium to form a second intermediate link of the intermediate links and with the first port to retransmit the data transmission. The second port may comprise a second link circuit to couple to the second data transmission medium, to transmit the data transmission to the second device, and a second local link control of the local link controls responsive to the control signal from the global link control to configure the second link circuit to operate in a second power mode of multiple power modes associated with the second link circuit based upon the activity assignment.

Another embodiment provides an apparatus. The apparatus may comprise forwarding logic to associate ports with multiple links between an origin and a destination for a data transmission to transmit the data transmission via the multiple links to the destination, each of the multiple links to comprise a first port with a transmitter communicatively coupled with a receiver of a second port via a data transmission medium. The apparatus may also comprise a global link control coupled with the forwarding logic to determine an activity assignment for the ports of the multiple links based upon the forwarding logic, wherein determining the activity assignment comprises determining the data frequency, traffic type, and medium type for the data transmission to transmit a control signal to the ports, the control signal being indicative of activity assignment, to instruct local link controls of the ports to configure link circuits of the ports based upon the activity assignment via local link controls of the ports.

BRIEF DESCRIPTION OF THE DRAWINGS

FIG. 3 depicts an embodiment of a flow chart for a global controller for reducing power consumption by a link; and FIG. 4 depicts an embodiment of a flow chart for a local controller for reducing power consumption by a link.

DETAILED DESCRIPTION OF EMBODIMENTS

The following is a detailed description of embodiments depicted in the accompanying drawings. However, the amount of detail offered is not intended to limit the anticipated variations of embodiments, but on the contrary, the intention is to cover all modifications, equivalents, and alternatives falling within the spirit and scope of the embodiments as defined by the appended claims. The detailed descriptions below are designed to make such embodiments obvious to a person of ordinary skill in the art.

Generally speaking, methods and arrangements for power reduction in links, such as transmitters and receivers, based upon global decisions such as the data transmission frequency, communications media, and traffic types associated with links, are contemplated. In particular, embodiments take advantage of high-level decisions to reconfigure internal circuits of links to reduce power consumption. At the global or system level, a decision determines the links that are active (i.e., turned on or off), the data frequency at which the links are operating, and the media through which the links transmit the data. These decisions are then communicated to the links.

At the local level, the links receive the decisions and each transmitter and receiver pair reconfigures internal circuitry automatically to minimize power based upon the decisions. In some embodiments, the links may receive the decisions in the form of power modes. For example, each link may receive a control signal indicating that the link should be in a turned off mode, a low power mode, and/or a standard power mode. In further embodiments, the links may receive settings such as an on/off setting, a data frequency setting, and a traffic/media setting. In such embodiments, the combination of the settings may indicate a power mode so, based upon the settings, the link may selectively adjust or modify the operation of the internal circuits of the transmitter and receiver.

While specific embodiments will be described below with reference to particular circuit configurations, power modes, and combinations of settings, those of skill in the art will realize that embodiments of the present invention may advantageously be implemented with other, substantially equivalent circuit configurations, power modes, and settings. In particular, the settings may be directly associated with a circuit of a transmitter and/or receiver and may, in some embodiments, indicate particular modifications to the circuit such as a change in the clock frequency for the circuit or a change in the voltage of the high voltage source, Vdd.

Figure 1:
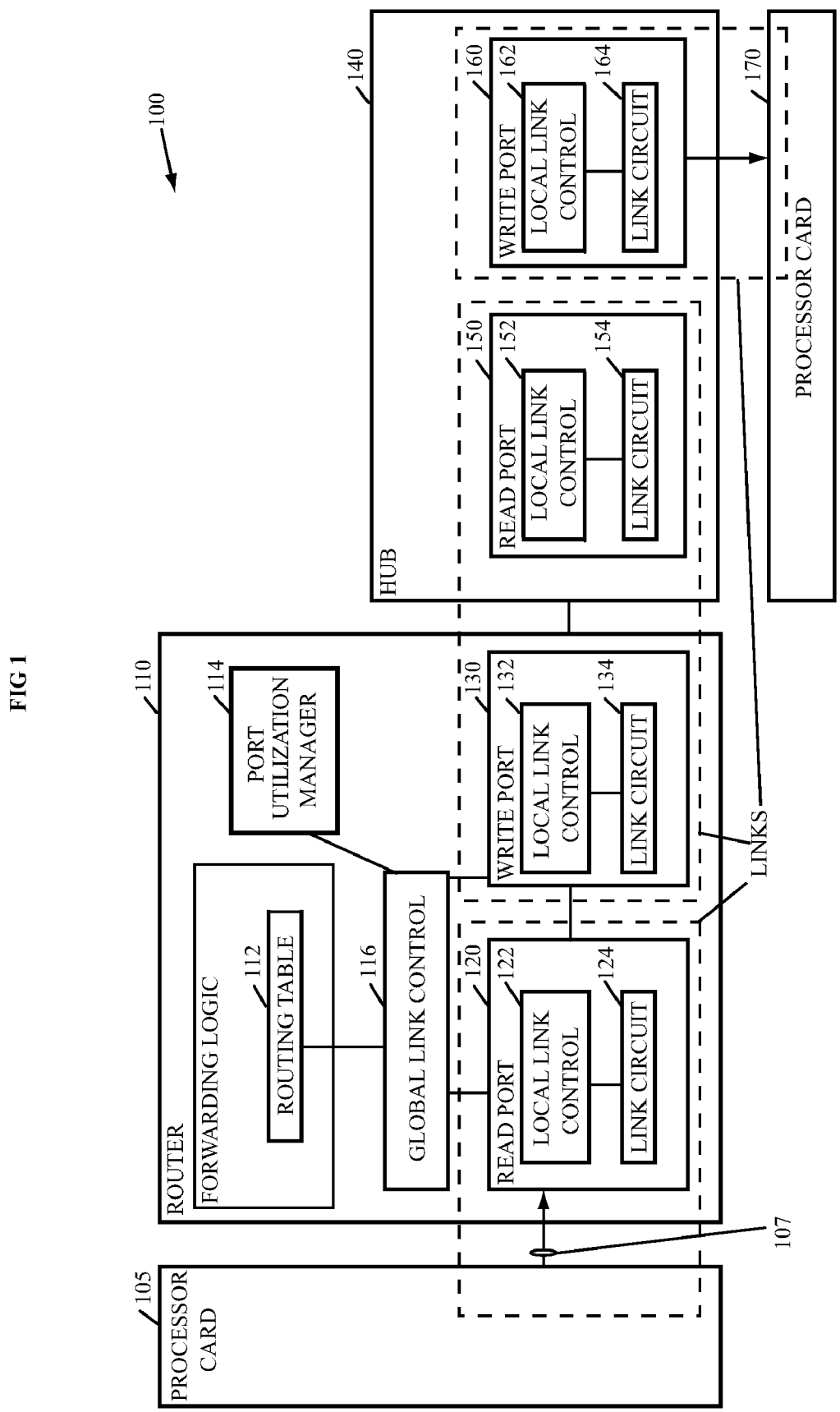
FIG. 1 depicts an embodiment of a system including a router and a hub to transmit data from one processor card to another.

Turning now to the drawings, FIG. 1 depicts an embodiment of a system 100 including a router 110 and a hub 140 to transmit data from a processor card 105 to a processor card 170. For example, processor card 105 may transmit data 107 to processor card 170 via router 110 and hub 140. Certain details such as data buffers are not shown explicitly for simplicity.

Router 110 may determine links through which the data 107 will be transmitted and adjust the operation of link circuits of the links to correlate power consumption by the links with characteristics of the data transmission. Router 110 may include routing table 112, port utilization manager 114, global link control 116, read port 120 and write port 130.

Routing table 112 may include a database that contains the current network topology, to direct packets of a data transmission out the appropriate port. Router 110 may determine the appropriate path 102 onto which data 107 should be forwarded from routing table 112 based upon a routing protocol. The routing protocol may also allow the network to dynamically adjust to changing conditions by describing how routers share updated information about the topology. For instance, routing table 112 may indicate a route 102 from processor card 105 to processor card 170 via read port 120, write port 130, read port 150, and write port 160.

Port utilization manager 114 may track availability and usage of ports such as ports 120, 130, 150 and 160. In the present embodiment, port utilization manager 114 is a global logic for tracking port utilization. In further embodiments, port utilization manager 114 may include logic incorporated into more than one switching chips of router 110 or a combination of global and switching chip level logic. For instance, router 110 may include, e.g., several switching chips, each having 100 ports and a port utilization manager that communicates with global link control. In other embodiments, port utilization manager 114 may include a signal received from logic exterior to router 110.

Based upon the availability of links and the routing information, global link control 116 may determine that ports 120, 130, 150, and 160 will transmit data 107 from processor card 105 to processor card 170. Global link control 116 may then gather information about data 107 to configure link circuits 124, 134, 154, and 164. In particular, global link control 116 may receive data from processor card 105 that describes data 107. For instance, global link control 116 may determine the type of encoding used to encode data 107 and based upon that encoding, determine the type of data traffic associated with transmitting data 107. For example, a real time video or audio encoding may include long strings of logical ones or zeroes that act as a filler for a video stream to describe the passage of time. The long strings of logical ones or zeroes are a difficult traffic condition because of the small number of transitions per unit time, providing clock and data recovery (CDR) loops little information for maintaining the phase of a sampling clock utilized to sample values for each bit in the data stream.

Further types of encoding may produce irregular or sporadic patterns of bit values that are also difficult for a receiver to decipher.

In addition to determining the traffic type, global link controller 116 may also determine, e.g., a data frequency at which to transmit data 107. For instance, global link control 116 may determine a rate at which processor card 105 can transmit data 107 as well as the limitations on data frequency, or bandwidth, throughout the links between processor card 105 and processor card 170.

Once global link control 116 determines data transmission characteristics such as the traffic type, the data frequency, and the route 102 for data 107, global link control 116 may determine a power mode for ports 120, 130, 150, and 160 to correlate power consumption with the characteristics or constraints of transmission of data 107. More specifically, when the traffic type is difficult such as the long strings of logical ones and zeroes or the data frequency is high, more complex logic and circuitry of link circuits 124, 134, 154, and 164 may be powered with higher voltages and clocked with higher clock frequencies to handle the data transmission. In such situations, a standard power mode may be selected and an indication of the standard power mode may be transmitted in a control signal to ports 120, 130, 150, and 160.

On the other hand, when the traffic type is not difficult, or is simple, and the data frequency is not sufficiently high to justify the use of the more complex logic and circuitry of link circuits 124, 134, 154, and 164, global link control 116 may transmit a control signal to ports 120, 130, 150, and 160 to indicate a low power mode. Further, global link control 116 may determine that other links (not shown) may not be needed to transmit data 107 so they may be turned off. In some of those situations, global link control 116 may also transmit a control signal to turn off and/or reduce power to circuitry of link circuits 124, 134, 154, and 164.

Ports such as read ports 120 and 150, and write ports 130 and 160 may include receivers and transmitters designed to respond to control signals from global link control 116 by configuring and/or re-configuring link circuits based upon the power mode indicated by the control signals. For example, local link control 122 may receive a control signal from global link control 116 to configure link circuit 124 to a low power mode and, in response, local link control 122 may, for instance, reduce the amplification of data 107.

Similarly, local link control 122 may receive a control signal from global link control 116 to re-configure link circuit 124 to a standard power mode. Re-configuring link circuit 124 to the standard power mode may facilitate transmission of data 107 at a higher data frequency.

After port 120 is configured to handle data 107, data 107 may be transmitted from processor card 105 to read port 120. Then, data 107 may be transmitted through ports 130, 150, and 160 to processor card 170. Advantageously, the ports 120, 130, 150, and 160 consume power at a rate based upon the routing decision of global link control 116 that corresponds to the difficulty in transmitting data 107 through system 100.

Figure 2:
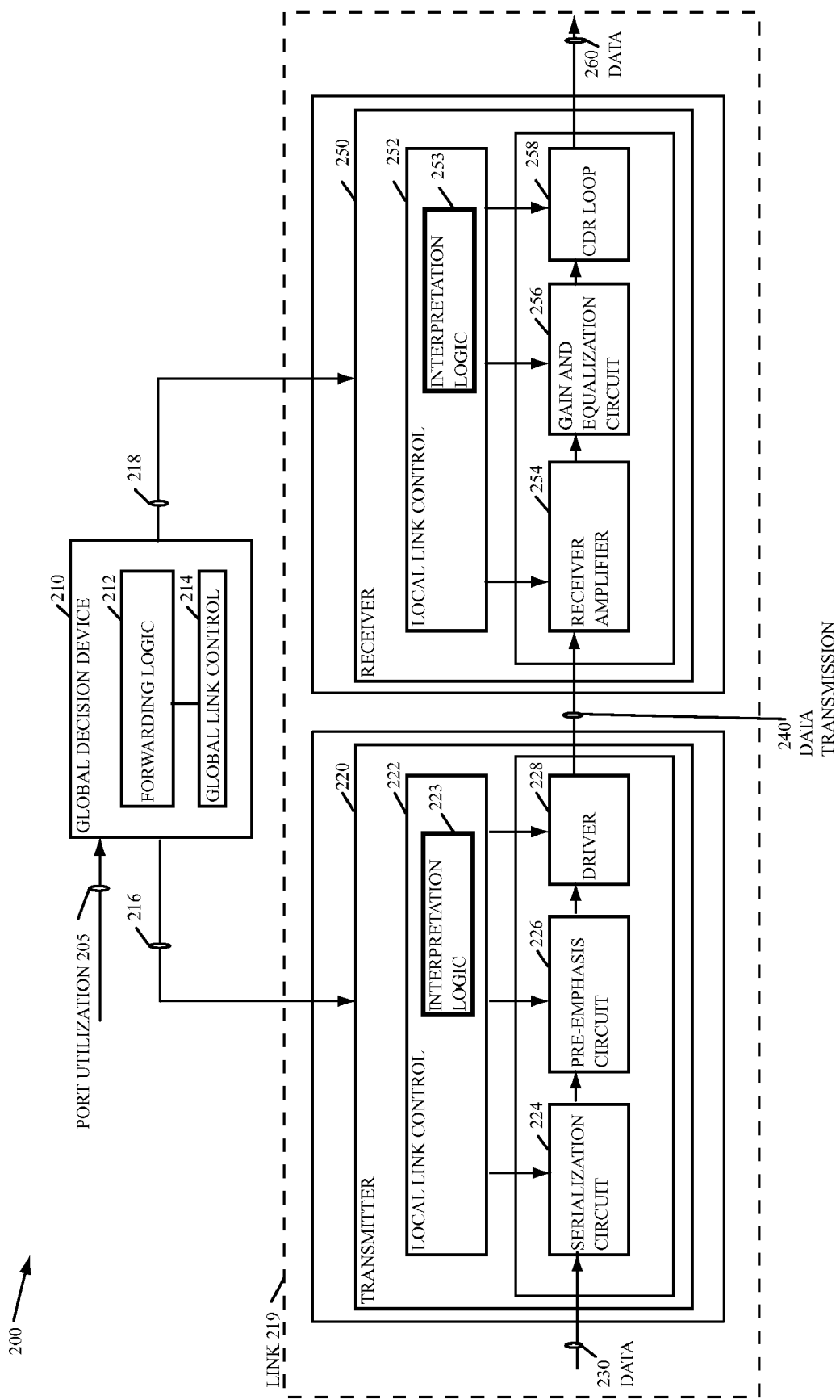
FIG. 2 depicts an embodiment of a network component such as the router in FIG. 1 for reducing power consumption by a link.

FIG. 2 depicts an embodiment 200 of a link 219 coupled with a global decision device 210 such as router 110 in FIG. 1. Embodiment 200 includes a global decision device 210 and a link 219. For example, global decision device 210 makes a routing decision that link 219 is to transmit data at three Gbps instead of ten Gbps. The routing decision involves changing the data frequency of link 219 from ten Gbps to three Gbps and link 219 includes transmitter 220 and receiver 250. Local link control 222 of transmitter 220 receives the decision as a control signal 216 and, in response, turns down the gain of an analog amplifier for driver 228 and turns off pre-emphasis circuit 226. Similarly, local link control 252 of receiver 250 receives the decision as a control signal 218 and, in response, turns down the analog, receiver amplifier 254 and turns off gain and equalization circuit 256. Advantageously, based upon the high-level, routing decision of global decision device 210, power consumption of link 219 is reduced.

Global decision device 210 may make a global decision regarding an activity assignment for link 219 based upon information about port utilization 205 and forwarding logic 212, and transmit a control signal 216 and 218 to link 219 to indicate the activity assignment for the link. More specifically, global decision device 210 may be part of a switch or router and comprise global link control 214 to determine data transmission characteristics such as the data frequency associated with link 219, the data traffic for link 219, and the medium through which data transmission 240 is transmitted. For example, global link control 214 may determine whether to turn off link 219 based upon destinations associated with incoming data transmissions and network topology information that associates ports between link 219 and the destination via forwarding logic 212. Global link control 214 may select a data frequency for link 219 based upon a data frequency of an incoming data transmission. And, global link control 214 may read packet headers of the incoming data transmission to determine whether a traffic pattern is a difficult pattern or a simple pattern.

Upon determining whether to turn link 219 off, the data frequency for link 219, and whether the traffic pattern is simple or difficult, these operating parameters may be transmitted in a control signal 216 directly to transmitter 220 and in a control signal 218 directly to receiver 250. In other embodiments, the operation parameters may be transmitted to transmitter 220 and transmitter 220 may communicate the operation parameters, or an indication thereof, to receiver 250, or vice versa.

The operating parameters resulting from the routing decision may be associated with a power mode for circuits of link 219 by interpretation logic 223 of transmitter 220 and interpretation logic 253 of receiver 250. More specifically, local link control 222 may receive the operation parameters and utilize interpretation logic 223 to translate the operation parameters into a power mode for serialization circuit 224, pre-emphasis circuit 226, and driver 228. For instance, when the operation parameters indicate that link 219 is to be turned off, interpretation logic 223 may indicate that one or more circuits of serialization circuit 224, pre-emphasis circuit 226, and driver 228 should be turned off, declocked, and/or operated at a minimum voltage and frequency.

On the other hand, when the operation parameters indicate that link 219 is to be turned on and to operate at a high frequency or transmit a difficult traffic pattern of data, interpretation logic 223 may indicate that pre-emphasis circuit 226 is turned on and operating at a high complexity level, and driver 228 is operating at a high gain. Operating pre-emphasis circuit 226 at a high complexity level and driver 228 at a high gain may involve increasing one or more clock frequencies associated with pre-emphasis circuit 226 and driver 228, and increasing the high voltage source(s) for the circuits in conjunction with increasing the frequency.

Similarly, receiver 250 may receive the operating parameters either directly from global decision device 210 via control signal 218, or from transmitter 220. In response to receiving operation parameters indicative of a power mode for receiver 250, or a circuit of receiver 250, interpretation logic 253 of local link control 252 may determine a configuration for a receiver amplifier 254, a gain and equalization circuit 256, and a clock and data recovery (CDR) loop 258. For example, receiver 250 may receive operating parameters describing link 219 as being turned on with a low data frequency and a simple traffic pattern. In response, receiver amplifier 254 and CDR loop 258 are reduced to a minimum gain and gain and equalization circuit 256 is turned off or reduced to a minimum functionality. In some embodiments, when CDR loop 258 is turned off, a substitute CDR loop having minimum functionality is enabled for receiver 250.

Some time after deciding that link 219 should be configured for a low data frequency and a simple traffic type, global decision device 210 may decide to change the activity of link 219. For instance, the data frequency for data transmissions between transmitter 220 and receiver 250 may vary between three Gigabits per second (Gbps) and six Gbps and when the data frequency of an incoming data transmission is at six Gbps, global decision device 210 may determine that link 219 should operate at a data frequency of six Gbps to transmit the data 230 from the incoming data transmission to receiver 250 via data transmission 240. Global link control 214 generates a control signal 216 for transmitter 220 and a control signal 218 for receiver 250. The medium type may be long or particularly lossy. And the traffic type may complicate clocking the data transmission, e.g., the data traffic may be very active, often switching between logical ones and logical zeroes at varying frequencies. Thus, global link control 214 may determine operating parameters that indicate a high data frequency and a difficult traffic type. In response, local link control 222 may turn on pre-emphasis circuit 226 and raise the frequencies and high voltage source for pre-emphasis circuit 226 to maximum ratings. Similarly, local link control 222 may increase the bias for driver 228 to a maximum.

Receiver 250 may receive the operating parameters via control signal 218. In response to control signal 218, local link control 252 may increase the bias for receiver amplifier 254 to a maximum, increase the complexity, high voltage source, and/or frequencies for gain and equalization circuit 256, and implement a circuit for CDR loop 258 having second and third order frequency tracking.

Upon adjusting the activity of link 219, serialization circuit 224 serializes data 230, clocking the data at six Gbps, and, in many embodiments, pre-amplifies the serialized data based upon input specifications for pre-emphasis circuit 226. In many embodiments, for instance, serialization circuit 224 includes a low frequency clock source having low jitter (to maximize the sampling window for the data) and a multiple phase output. The rising and/or falling edges of the multiple phases are utilized to clock parallel inputs of data 130 into a single, six Gbps data stream.

Pre-emphasis circuit 226 may utilize a finite impulse response (FIR) equalizing filter to cancel or at least reduce frequency-dependent attenuation such as attenuation caused by the skin-effect resistance of copper wire when copper wire is the medium through which data transmission 240 is transmitted. Pre-emphasis circuit 226 accentuates the high frequency components of the data signal to at least partially alleviate the effects of inter-symbol interference (ISI).

Then, driver 228 drives data transmission 240 across a medium such as a copper wire or an optical fiber. In some embodiments, for example, driver 228 may include a Fibre Channel driver and data transmission 240 may be transmitted through a channel of a fiber optic cable.

Receiver 254 receives data transmission 240 from driver 228 and pre-amplifies data transmission 240 for gain and equalization circuit 256. Gain and equalization circuit 256 amplifies data transmission 240 and accentuates the high frequency components to attempt to increase the sampling window for the data. Then, CDR loop 258 samples the data from the data signal, compares the phase of the sampling clock to the phase of the data transmission 240 and adjusts the sampling clock accordingly. When second order and third order frequency tracking circuits are included in CDR loop 258, second and third order corrections are made to adjustments of the sampling clock phase. For example, initial samples from the data transmission indicate instantaneous, high frequency changes to the phase of the data transmission. Second order and third order frequency tracking circuits observe and correct for lower frequency changes in the phase of data transmission 240. Once CDR loop 258 samples the data transmission 240, the determined values of the bits are output as data 260.

Referring now to FIG. 3, there is shown an example of a flow chart 300 for a global controller such as router 110 of FIG. 1. The global controller may determine activity assignments for each link and the activity assignments may be communicated to the local controller of the link in the form of one or more power modes or one or more settings that are indicative of power modes for link circuits such as circuits for pre-emphasis, amplification, equalization, and CDR. Flow chart 300 begins with turning off unnecessary links (element 310). More specifically, a high-level decision device determines which links to turn off based upon forwarding logic such as a routing table and the current utilization of ports associated with the links.

After the unnecessary links are turned off, the high-level decision device assigns destination nodes to active links to utilize the links for different, incoming data transmissions based upon forwarding logic (element 320). Selecting destination nodes for the active links may involve assigning particular incoming data transmissions to ports associated with particular active links. In further embodiments, assigning destination nodes to a link involves selecting a medium through which the link will transmit data. Selecting the medium may be more prevalent, for example, in optical routers.

Once the destination nodes are assigned to ports of active links, characteristics of a data transmission associated with the ports of active links are collected to determine an activity assignment for the corresponding active link (element 330). The activity assignment may describe, for instance, the data frequency for the data transmission, and the media type and traffic type of the data transmission. In some embodiments, the activity assignment may be represented by a power mode.

The activity assignment is then transmitted to the link and if there are more links for which the global decision device determines an activity assignment (element 345), characteristics associated with the data transmission for those links are determined (element 330) and transmitted (element 340).

Referring now to FIG. 4, there is shown an example of a flow chart 400 for local controller such as transmitter 220 or receiver 250 as shown in FIG. 2. The local controller may include a local link control such as local link control 222 or local link control 252 in FIG. 2. For example, the local controller may receive an activity assignment from a high-level decision device such as a router that determines what data will be transmitted via a link associated with the local controller, and what medium will be used to transmit that data to a destination.

Flow chart 400 begins with receiving an activity assignment (element 410) for a link. The activity assignment may indicate a data frequency, a media type and/or a traffic type for a data transmission to be processed by one or more link circuits associated with the link.

Based upon the activity assignment, the power modes of each of the one or more link circuits may be determined (element 420). For instance, when the activity assignment includes a data frequency and the data frequency is a relatively high frequency, link circuits may be configured to operate in a high power consumption state to process the high data frequency. Similarly, if the activity assignment includes an indication that the traffic type is difficult, link circuits may be configured to operate in a high power consumption state to amplify, pre-emphasize and/or equalize the data transmission.

Upon determining the power mode for the link circuit, the link circuit is configured based upon the power mode to adjust power consumption (element 430). Whether the power consumption of the link circuit is high to accommodate high data frequencies or difficult traffic types, the link circuit is dynamically configured to, advantageously, consume an amount of power related to the complexity of the data transmission.

Then, if the link includes additional link circuits, the additional link circuits are configured based upon the activity assignment communicated by the high-level decision device (element 440).

It will be apparent to those skilled in the art having the benefit of this disclosure that the present invention contemplates methods and arrangements for power reduction in links, such as transmitters and receivers, based upon global decisions such as the activity, data transmission frequency, communications media, and traffic type associated with links. It is understood that the form of the invention shown and described in the detailed description and the drawings are to be taken merely as examples. It is intended that the following claims be interpreted broadly to embrace all the variations of the example embodiments disclosed.

What is claimed is:

1. An apparatus to retransmit a data transmission between a first device and a second device via intermediate links, the apparatus comprising:
  a global link control to determine ports of the intermediate links to transmit the data transmission to a destination device; to determine an activity assignment for the ports of the multiple links based upon forwarding logic, wherein determining the activity assignment comprises determining a data frequency, traffic type, and medium type for the data transmission; and to transmit a control signal with the activity assignment to local link controls of the intermediate links associated with the data transmission;
  a first port to communicatively couple with a transmitter of the first device via a first data transmission medium to form a first intermediate link of the intermediate links, the first port comprising a first link circuit to couple to the first data transmission medium, to receive the data transmission from the first device, and a first local link control of the local link controls responsive to the control signal from the global link control to configure the first link circuit to operate in a first power mode of multiple power modes associated with the first link circuit based upon the activity assignment; and
  a second port to communicatively couple with a receiver of the second device via a second data transmission medium to form a second intermediate link of the intermediate links and with the first port to retransmit the data transmission, the second port comprising a second link circuit to couple to the second data transmission medium, to transmit the data transmission to the second device, and a second local link control of the local link controls responsive to the control signal from the global link control to configure the second link circuit to operate in a second power mode of multiple power modes associated with the second link circuit based upon the activity assignment.

2. The apparatus of claim 1, wherein the first link circuit comprises a clock and data recovery loop, wherein an ability of the clock and data recovery loop to track changes in a phase of the data transmission varies between the first power mode and other of the multiple power modes associated with the first link circuit.

3. The apparatus of claim 1, wherein the first link circuit comprises circuitry that is configurable to adjust amplification of the data transmission.

4. The apparatus of claim 1, wherein the first link circuit comprises a gain and equalization circuit being configurable via the first local link control in response to the control signal to compensate for attenuation and distortion based upon a medium associated with the data transmission.

5. The apparatus of claim 4, wherein first local link control comprises interpretation logic to reconfigure the first link circuit in response to the control signal, wherein the control signal is related to a traffic type associated with the data transmission.

6. The apparatus of claim 1, wherein the first local link control comprises interpretation logic to adjust an operating voltage and frequency for the first link circuit in response to an indication by the control signal of a data frequency for the data transmission.

7. The apparatus of claim 1, wherein the second link circuit comprises a serialization circuit that is configurable via the second local link control to process the data transmission in accordance with a data frequency indicated by the control signal.

8. The apparatus of claim 1, wherein the second link circuit comprises a pre-emphasis circuit that is configurable via the second local link control in response to the control signal.

9. The apparatus of claim 1, wherein the second local link control is to reconfigure the second link circuit in response to the control signal, wherein the control signal is indicative of a length of a medium for the data transmission.

10. The apparatus of claim 1, wherein the second local link control comprises interpretation logic to select the second link circuit and the second power mode for the second link circuit based upon the control signal.

11. The apparatus of claim 10, wherein the interpretation logic comprises a table to associate the second power mode with a data frequency, wherein the control signal indicates the data frequency.

12. An apparatus, comprising:
  forwarding logic to associate ports with multiple links between an origin and a destination for a data transmission to transmit the data transmission via the multiple links to the destination, each of the multiple links to comprise a first port with a transmitter communicatively coupled with a receiver of a second port via a data transmission medium; and
  a global link control coupled with the forwarding logic to determine an activity assignment for the ports of the multiple links based upon the forwarding logic, wherein determining the activity assignment comprises determining the data frequency, traffic type, and medium type for the data transmission to transmit a control signal to the ports, the control signal being indicative of activity assignment, to instruct local link controls of the ports to configure link circuits of the ports based upon the activity assignment via local link controls of the ports.

13. The apparatus of claim 12, further comprising a local link control, responsive to the control signal, to configure the circuitry associated with at least one of the multiple links to operate in a power mode associated with the control signal.

14. The apparatus of claim 13, wherein the local link control comprises part of a receiver and is designed to adjust power consumption by the at least one of the multiple links by selecting the power mode, wherein the power mode maintains a data throughput.

15. The apparatus of claim 13, wherein the local link control comprises part of a transmitter, the transmitter being adapted to deactivate a gain and equalization circuit based upon the control signal.

16. The apparatus of claim 13, wherein the local link control is adapted to change an operating frequency and an operating voltage for the circuitry based upon the control signal.

17. The apparatus of claim 12, wherein the global link control is designed to communicate a routing decision of a router for the ports of the multiple links in the control signal to the local link controls of the multiple links, wherein the routing decision determines a data frequency, a traffic type, and a medium type for the data transmission, to configure the ports in accordance with the routing decision.

* * * * *